US00RE38883E

(19) United States
(12) Reissued Patent
Wyard

(10) Patent Number: US RE38,883 E
(45) Date of Reissued Patent: Nov. 22, 2005

(54) METHOD AND SYSTEM FOR THE DIRECT MANIPULATION OF INFORMATION, INCLUDING NON-DEFAULT DRAG AND DROP OPERATION

(75) Inventor: Adrian Wyard, Seattle, WA (US)

(73) Assignee: Microsoft Corporation, Redmond, WA (US)

(21) Appl. No.: 09/776,543

(22) Filed: Feb. 2, 2001

Related U.S. Patent Documents

Reissue of:
(64) Patent No.: 5,867,144
Issued: Feb. 2, 1999
Appl. No.: 08/462,506
Filed: Jun. 5, 1995

U.S. Applications:
(60) Division of application No. 08/278,455, filed on Jul. 21, 1994, now abandoned, which is a continuation-in-part of application No. 08/054,565, filed on Apr. 28, 1993, now abandoned, and a continuation-in-part of application No. 07/794,063, filed on Nov. 19, 1991, now abandoned.

(51) Int. Cl.[7] ..... G09G 5/00
(52) U.S. Cl. ..... 345/769; 345/764; 345/770; 345/811; 345/856; 715/531; 715/539
(58) Field of Search ..... 707/531, 539, 707/540, 689; 345/764, 769, 770

(56) References Cited

U.S. PATENT DOCUMENTS

| | | | | | |
|---|---|---|---|---|---|
| 4,931,783 | A | * | 6/1990 | Atkinson | 345/163 |
| 5,040,131 | A | * | 8/1991 | Torres | 345/810 |
| 5,140,678 | A | * | 8/1992 | Torres | 345/777 |
| 5,157,763 | A | * | 10/1992 | Peters et al. | 345/769 |
| 5,276,795 | A | * | 1/1994 | Hoeber et al. | 345/813 |
| 5,630,080 | A | * | 5/1997 | Malamud et al. | 345/769 |

OTHER PUBLICATIONS

"Mindwrite: Thought Processors"; Eugenides Tan, Nibble Mac, vol. 2, No. 2, p. 18110, Apr. 1, 1987.*
"Positive for Windows 3.0"; User's Guide 1990; pp. 278–280, 284–285.*
"Microsoft to Debut Office–Linking Spec. (Object Linking and Embedding Tech.", Paul M. Sherer, PC Week, vol. 7, Issue N49, Dec. 10, 1990.*
"Mastering Windows.sup..TM. 3.0" Robert Cowart 1990, pp. 68–71, 86–87, 224–227.*
"Positive For Windows.sup.198 3.0 User's Guide," 1990, pp. 278–285.*
Kinatu, chris, and Gordon McComb, "Working With Word: The Definitive Guide to Microsoft Word on the Apple MacIntosh," Second Edition, Version 4, 1989, pp. 112–113.*
"Microsoft Windows: User's Guide," 1987, pp. 59 of Book and pp. 18–24 of Book 4.*
Flammang, James m., "Review Portfolio: A Frame of Mind: MindWrite Outliner and Organizer,"Publish, vol. 2(5), pp. 86/2 and 06/87.*
"Developing NeXTSTEP.sup..TM. Applications," Sams Publishing, 1995, Chapter 19, pp. 460–501.*
Stern, Uri Joseph, and James Stan Morrow, "OS/2 Warp Presentation Manager for Power Programmers," John Wiley 7 Son's, Inc., 1995, Chapter 7, pp. 159–198.*

* cited by examiner

*Primary Examiner*—Matthew Luu
(74) *Attorney, Agent, or Firm*—Merchant & Gould P.C.

(57) ABSTRACT

A user is provided with an easy-to-use approach to directly manipulating text in a word processing environment or the like. Text may be dragged from one location and dropped in another location to move the text to a new location. More generally, the user is provided with the option of performing a conventional drag and drop operation or an enhanced or non-default drag and drop operation. Separate buttons on a mouse are utilized to differentiate between the two types of drag and drop operations. In the conventional drag and drop operation, default behavior is exhibited when an object is dropped on another object. In the enhanced drag and drop operation, a user is presented a list of options of operations that may be performed when the object is dropped on the other object.

8 Claims, 12 Drawing Sheets

METHOD AND SYSTEM FOR THE DIRECT MANIPULATION OF INFORMATION, INCLUDING NON-DEFAULT DRAG AND DROP OPERATION

Matter enclosed in heavy brackets [ ] appears in the original patent but forms no part of this reissue specification; matter printed in italics indicates the additions made by reissue.

CROSS-REFERENCE TO RELATED APPLICATION

This application is a division of U.S. patent application Ser. No. 08/278,455, filed Jul. 21, 1994, now abandoned, which is a continuation-in-part of Ser. No. 08/054,565, filed on Apr. 28, 1993, now abandoned, which is a continuation-in-part of Ser. No. 07/794,063, filed on Nov. 19, 1991, now abandoned.

TECHNICAL FIELD

The present invention relates generally to data processing system and, more particularly, to the direct manipulation of information by users, including drag and drop operations.

BACKGROUND OF THE INVENTION

The ability to manipulate selected portions of text in a document is a common feature of word processing programs. Presently, there are word processing programs which allow a user to select a string of text and manipulate it in some way, such as moving it to a new location on the document, copying it to a new location on the document or deleting it from a document. The problem with such prior art systems is that they require a user to go through several time-consuming steps before the text manipulation is actually carried out.

For example, to move a string of text from one location to another in a document using a typical prior art system, a user is required to 1) select the string of text to be manipulated; 2) delete or "cut" the selected string of text from the location using a combination of keys or by selecting the delete or cut command; 3) move the insertion point to the new location on the document where the selected string of text is to be moved; and 4) insert or "paste" the selected string of text to the new location using a combination of keys or by selecting the insert or paste command. Similar steps are required for copying text from one location to another in a document.

In word processing systems such as Microsoft Word, that support mouse operations, a user may select text with a mouse by positioning the point at the beginning of the selection, depressing a predefined mouse button, dragging the insertion point to the end of the selection while holding down the mouse button and then releasing the mouse button. After selection, cut and paste operations, such as described above, may be performed on the selected text.

The prior art systems require a user to be familiar with a variety of function keys and edit commands. When the user is making numerous revisions to a document, it is inconvenient to perform so many steps in order to move or copy text. The user is forced to perform awkward key combinations, such as depressing the Shift key and the Delete key at the same time. No technique is known in the word processing environment for moving or copying text without going through time-consuming cut and paste type operations or performing awkward key combinations.

SUMMARY OF THE INVENTION

In accordance with the first aspect of the present invention, a method and system is provided for directly manipulating text in a word processing environment or the like. After a user has selected text to be manipulated, the manipulation may be carried out with little effort on the part of the user. In accordance with this aspect of the present invention, the user merely positions the mouse pointer over the selected text, depresses and holds down a predefined mouse button, drags the insertion point to a new location and then releases the mouse button. Depending on whether the Alt key was depressed when the mouse button was released, the user may be presented with options such as whether the manipulation should be to move, copy or link the selected text, or the selected text may be moved and no option presented.

In accordance with another aspect of the present invention, a method is practiced in a data processing system having an input device and a video display. In this method, a source-visual element, such as an icon that is associated with the source object, is displayed on the video display along with a cursor and a target-visual element, such as an icon that is associated with the target object. The source-visual element is selected for movement in response to a user positioning the cursor in proximity with the source-visual element using the input device. The input device may be a mouse with at least two buttons. The source-visual element is moved on the video display in response to use of the input device by the user. The source-visual element is displayed on the video display in proximity to the target-visual element. The source-visual element may be moved in response to the user depressing a predetermined one of the buttons of the mouse and moving the mouse when the input device is a mouse with at least two buttons.

The source-visual element is dropped on the target-visual element in response to the use of the input device by the user while the source-visual element is in proximity with the target-visual element. If the input device is a mouse with at least two buttons, the source-visual element may be dropped by releasing the predetermined one of the buttons that was depressed to move the source-visual element. The menu of operations is then displayed on the video display. One of these operations may be selected by the user and involve the source object and the target object. The system determines if any of the operations displayed on the menu is selected by the user and determines the identity of any such user-selected operation. The system then performs the user-selected operation with the source object and the target object.

The menu of operations displayed on the video display may display a default operation. The default operation may have a visual indication or queue which indicates that it is the default operation. For example, the default operation may be boldfaced.

In accordance with another aspect of the present invention, a method is practiced wherein the first visual element that is associated with the first object is dragged across the video display to be in proximity with the second visual element that is associated with the second object on the video display. The drag is performed in response to a user using the input device (such as a mouse). The first visual element is dropped onto the second visual element in response to the user using the input device to perform a first default operation. The first default operation involves the first object of the second object. When the input device is a mouse with the first button and a second button, the drag and the drop is performed using the first button of the mouse.

A third visual element that is associated with the third object is dragged across the video display in response to the user using the input device to be proximity of a fourth visual element that is associated with the fourth object. The third visual element is then dropped onto the fourth visual element of the video display in response to the user using the input device. When the input device is the mouse having the first and second buttons, the dragging of the third visual element and dropping of the third visual element is performed using the second button. A menu of operations that the user may perform with the third object and the fourth object is displayed on the video display in response to the dropping of the third visual element. The system determines if any of the operations displayed on the menu have been selected by the user and determines the identity of any such user-selected operation. The system then performs the selected operation.

In accordance with still another aspect of the present invention, the first type of drag and drop operation is performed in response to the user using a first button of a two-button mouse to interact in the first drag and drop operation. The first type of drag and drop operation includes a drag portion and a drop portion. A default operation is performed after the drop portion of the first drag and drop operation.

A second drag and drop operation is then performed. The second drag and drop operation also has a drag portion and a drop portion. The second drag and drop operation is performed in response to the user using the second button of the mouse to interact with the system in the second drag and drop operation. After completion of the drop portion of the second drag and drop operation, a menu is displayed in the video display which lists choices of operations that the user may select to be performed as a result of the second drag and drop operation. The system determines which of the operations displayed on the menu is selected by the user and performs a selected operation.

DETAILED DESCRIPTION OF THE INVENTION

A first preferred embodiment of the present invention provides a method and system for directly manipulating text in a word processing environment or the like in a fashion that requires little effort on the part of the user. For example, the user may drag and drop text in order to move the text to new locations. In accordance with a second preferred embodiment of the present invention, the user is provided with the option of providing an expanded drag and drop operation in which the user selects and performs one of several different operations, rather than merely performing the default operation or employing difficult to use modifier keys to perform a limited number of operations. In this second preferred embodiment, the user also has the option of performing a conventional drag and drop operation. The drag and drop operations are not limited to text manipulations.

Figure 1:
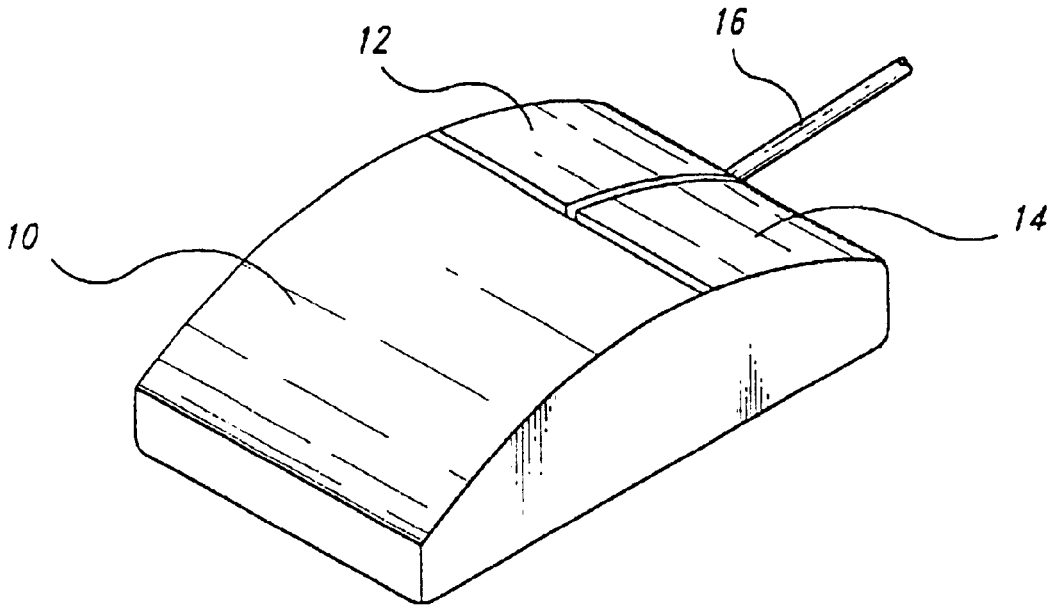
FIG. 1 is a diagram of a two-button mouse used in the preferred embodiments of the present invention.

FIG. 1 shows an example of a two-button mouse that is suitable for performing a drag and drop operation. The two-button mouse 10 includes a left button 12 and a right button 14. A roller ball (not shown) is provided on the underside of the mouse 10 to generate directional commands as the mouse rolls along a flat surface.

Figure 2:
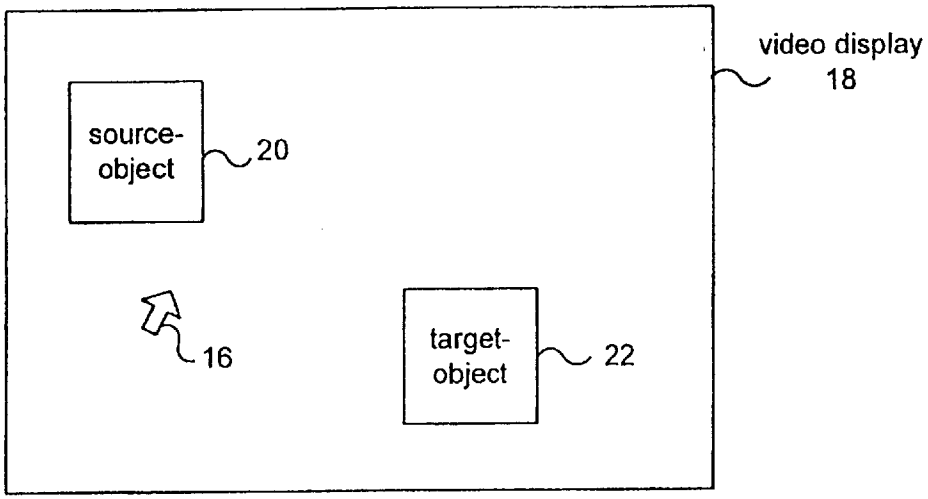
FIG. 2 is a diagram depicting graphic elements displayed on a video display.

As is illustrated in FIG. 2, the movement of the mouse is translated into the movement of the cursor 16 on a video display 18.

Figure 3:
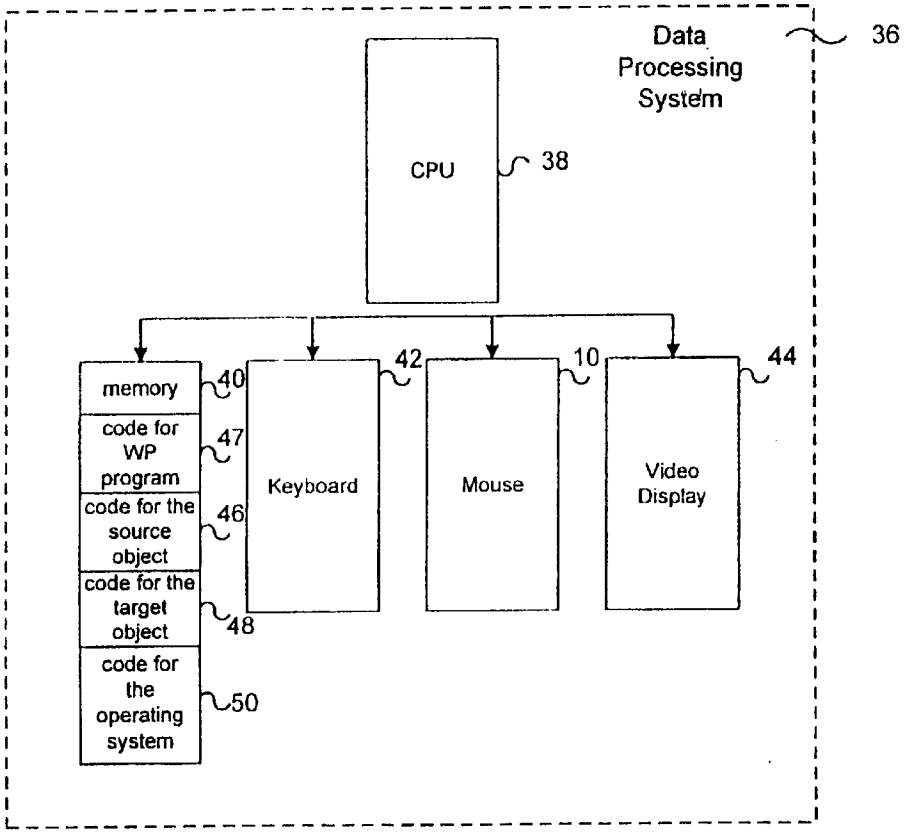
FIG. 3 is a block diagram of data processing systems suitable for practicing the preferred embodiments of the present invention.

FIG. 3 shows a block diagram of an illustrated data processing system for practicing the preferred embodiment to the present invention. The data processing system 36 includes a central processing unit (CPU) 38, a memory 40, a keyboard 42, a video display 44 and the conventional two-button mouse 10. Those skilled in the art will appreciate that another style mouse, such as the three-button mouse, may be used with the present invention as well. The memory 40 holds code for a word processing (WP) program 47. In addition, for each drag and drop operation performed in the second preferred embodiment of the present invention, code for the source object 46, code the target object 48 and code for the operating system 50 are stored within the memory 40.

Figure 4:
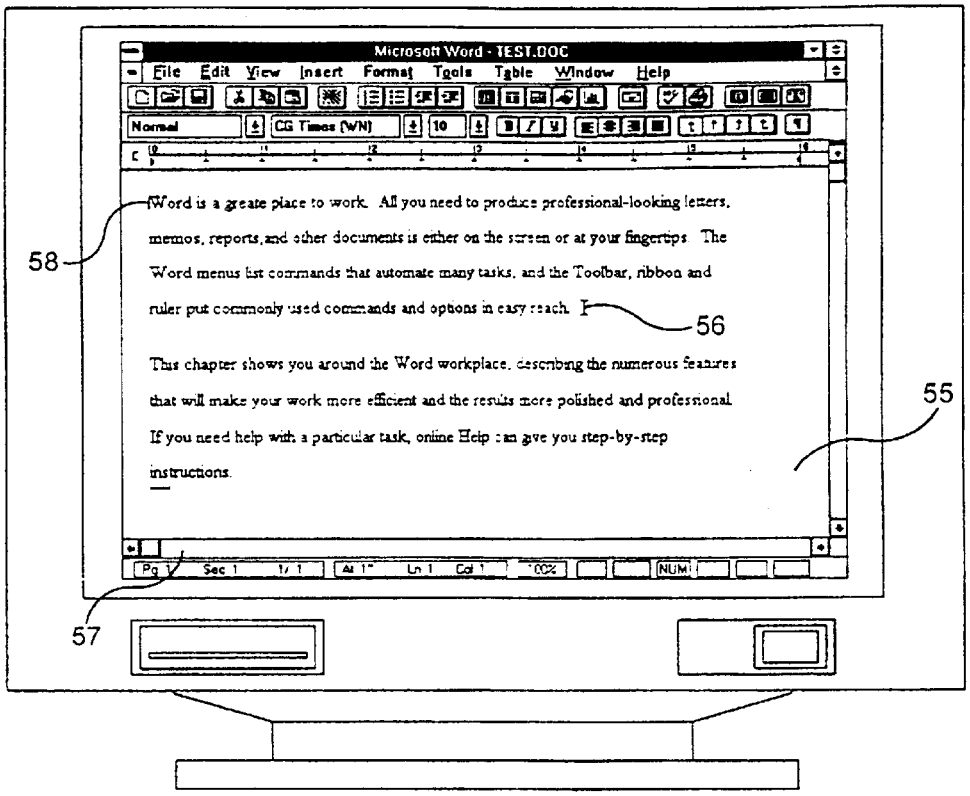
FIG. 4 shows a typical word processing window, a pointer and an insertion point as they are seen on a display screen by a user in the first preferred embodiment of the present invention.

FIG. 4 shows a typical word processing window 57, as provided by the first preferred embodiment of the present invention. FIG. 4 also shows a pointer 56 and an insertion point 58, as they are seen on the display screen 55 by user. The mouse 10 (FIG. 1) is used to position the pointer 56, normally in the shape of an I-beam, over text/data displayed on the display screen 55. When the mouse button 12 is depressed, the insertion point 58 appears at the location of the pointer 56. If the pointer 56 is positioned beyond the end of a line and the mouse button 12 is depressed, the insertion point appears immediately after the last character on the line, not directly under the pointer. If the mouse 10 is moved while the mouse button 53 is depressed, the insertion point is, in effect, dragged and text/data is highlighted as the insertion point is dragged over it to signify selection. The highlighting begins over the text when the mouse button 12 is depressed and continues to the text where the mouse button 12 is released.

Figure 5:
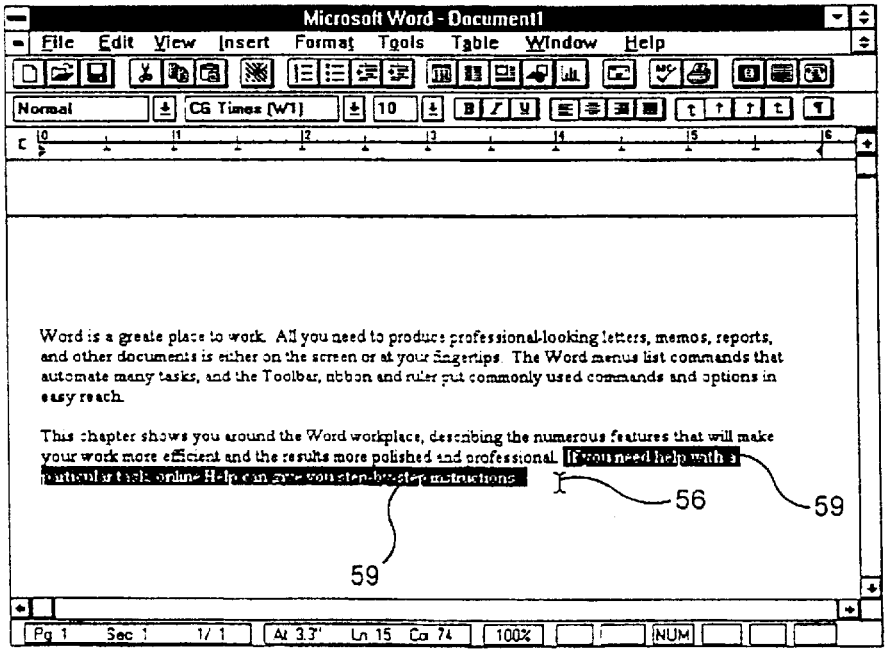
FIG. 5 shows a word processing document, as viewed on the display screen, after a user selects a string of text in the first preferred embodiment of the present invention.

FIG. 5 shows the user-selected text highlighted on the display screen. The pointer 56 remains in the shape of an I-beam, while the insertion point 58 disappears when the selection is made. If the primary mouse button 12 is depressed when the pointer 56 is not over any part of the selected text 59, the selection is canceled when the insertion point 58 appears at the location corresponding to the pointer 56.

Figure 6:
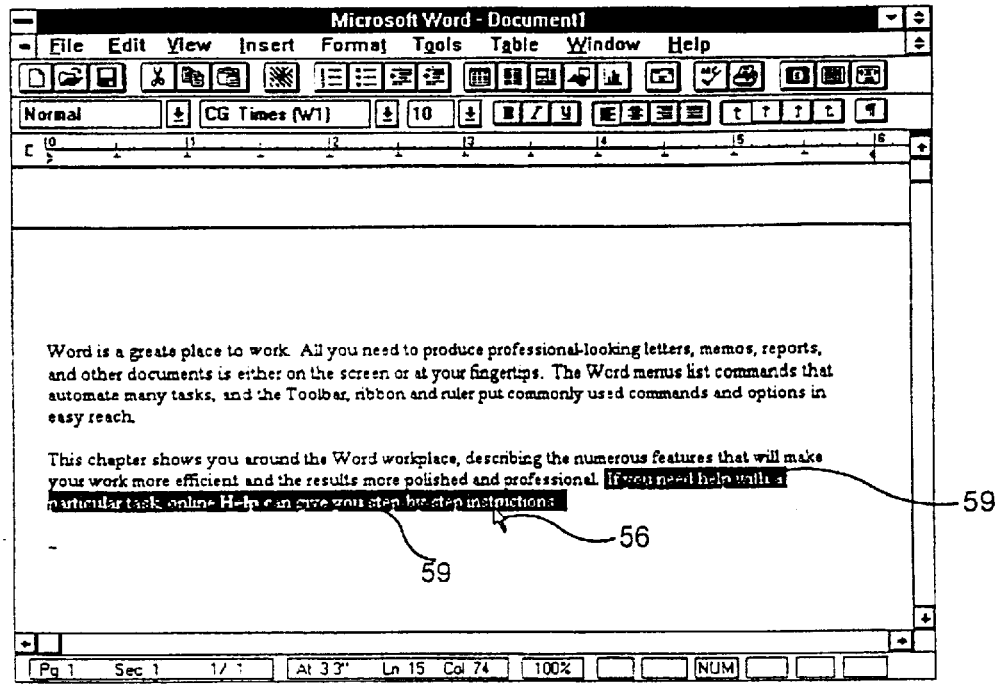
FIG. 6 shows a word processing document, as viewed on a display screen, after the user positions the pointer over the selected text in the first preferred embodiment of the present invention.

FIG. 6 shows the new shape of the pointer 56 after the pointer is positioned over selected text 59. In the first preferred embodiment described herein, the pointer 56 takes the shape of a slanted arrow while it is positioned over the selected text 59. After the text is selected, it is treated as a single object.

Figure 7:
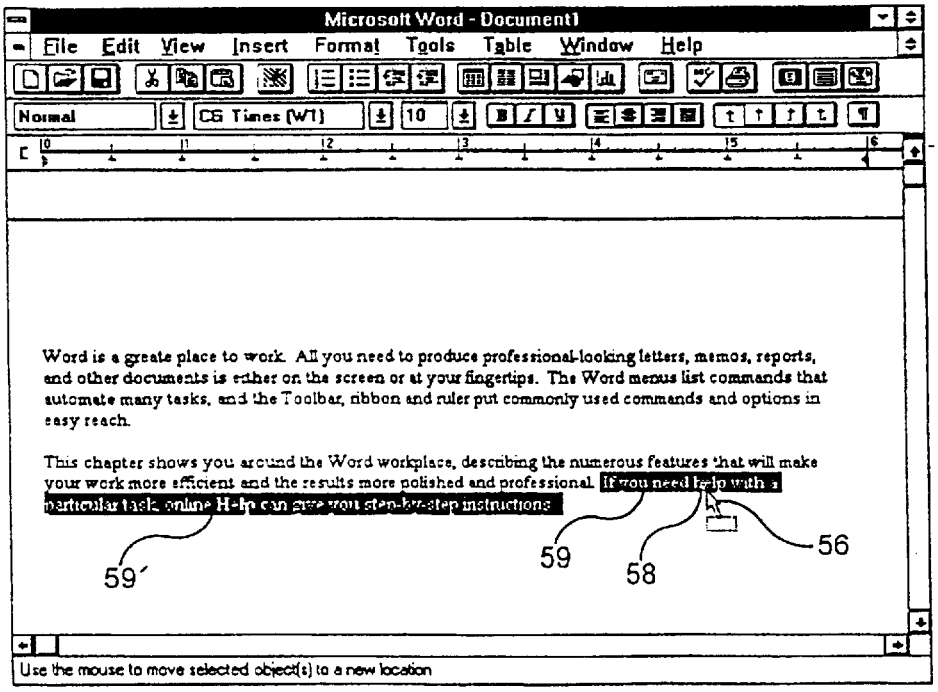
FIG. 7 shows a word processing document, as viewed on a display screen, after a user presses the predefined mouse button while the pointer is positioned over a selected text in the first preferred embodiment of the present invention.

FIG. 7 shows the new shape of the pointer 56 after the user depresses the mouse button 53 while the pointer 56 is positioned over the selected text 59. In the first preferred embodiment of the present invention, the pointer takes the shape of a slanted arrow coming out of the dash-lined square and the insertion point 58 appears as a dash vertical bar when the mouse button 53 is depressed while the pointer 56 is positioned over the selected text 59. A mouse then appears at the bottom of the screen prompting the user to use the mouse to move the selected text to a new location. If the mouse button 12 is depressed and released while the pointer 56 is over any part of the selected text, the selection is canceled. The insertion point appears under the pointer 56, and both the insertion point and the pointer reassume their original shapes.

Figure 8:
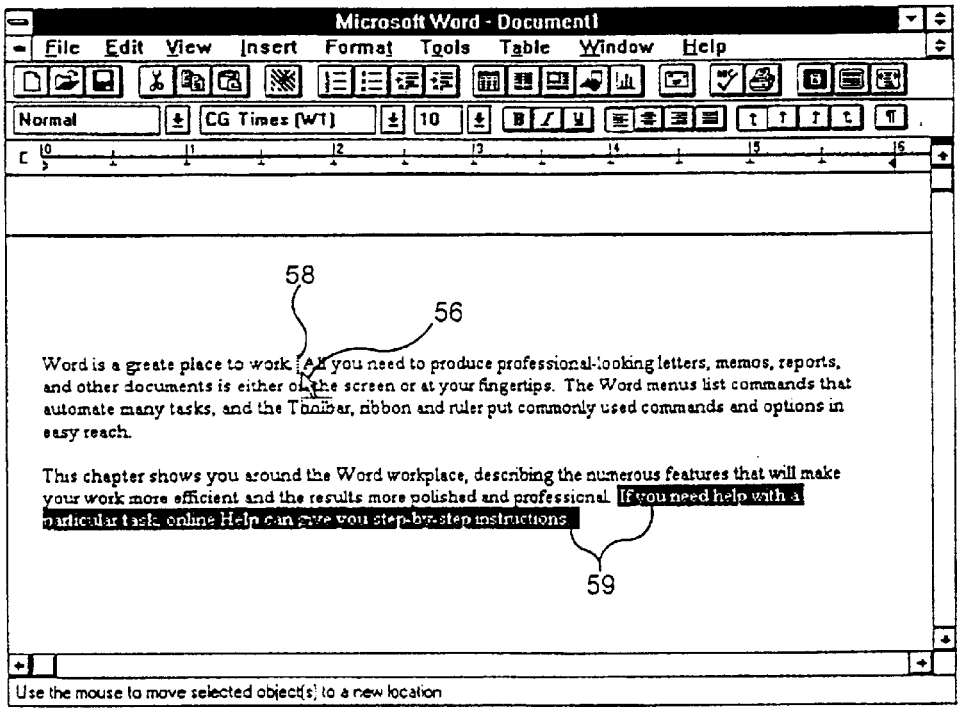
FIG. 8 shows a word processing document, as viewed on a display screen, after a user has dragged the insertion point to the location of the document where the selected text is to be moved in accordance with the first preferred embodiment of the present invention.

FIG. 8 illustrates the display screen after the user has dragged the insertion point 58 to the location of the document where the selected text 59 is to be inserted. The insertion point 58 was moved by the user holding down the mouse button 53 and repositioning the pointer 56.

Figure 9:
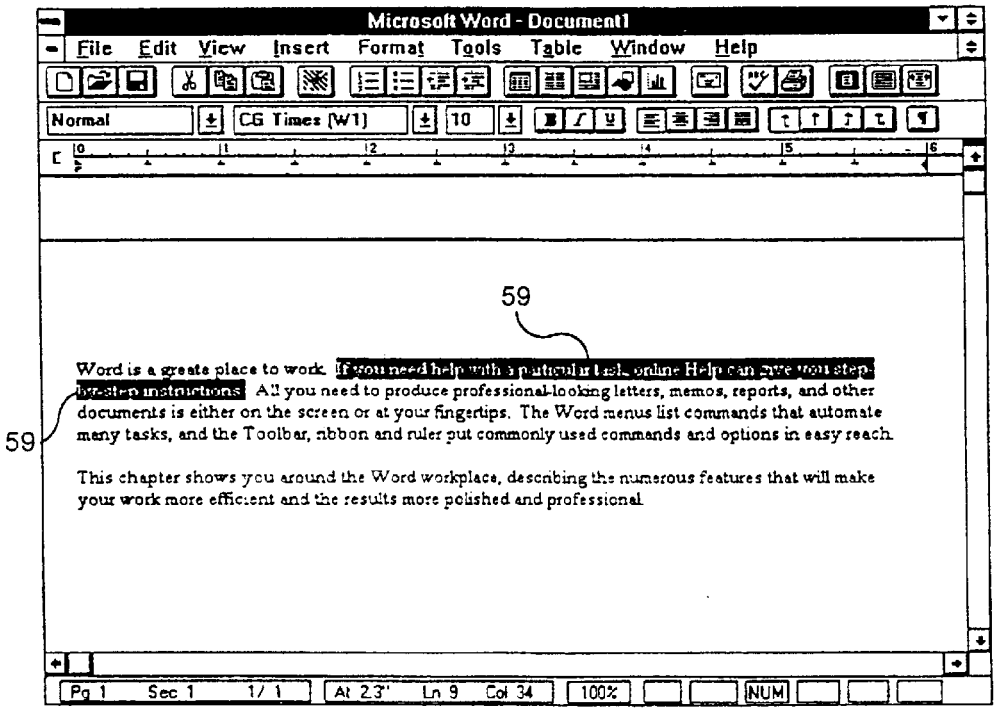
FIG. 9 shows a word processing document, as viewed on a display screen, after a user has dragged the insertion point to a location outside of the selected text and released the predefined mouse button in accordance with the first preferred embodiment of the present invention.

FIG. 9 shows the results of the text manipulation, in this case, a move operation. The selected text 59 was deleted from its previous location and inserted at the location marked by the insertion point after the user released the mouse button 12. The text remains highlighted after the text manipulation is completed.

Figure 10:
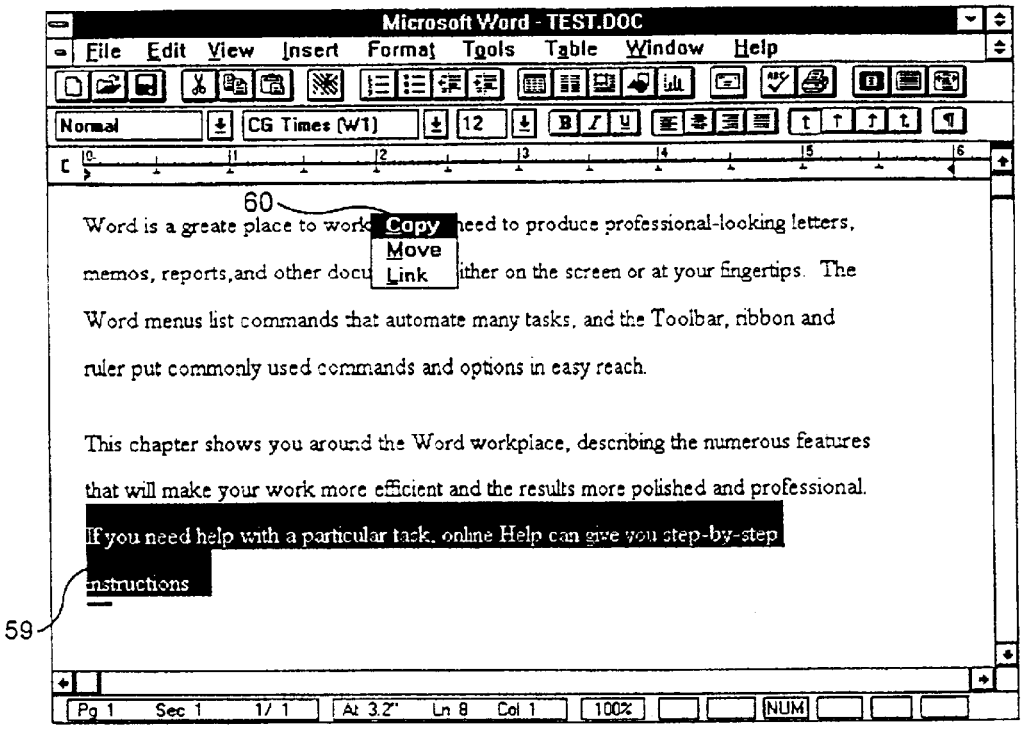
FIG. 10 shows a word processing document, as viewed on a display screen, after a user has dragged the insertion point to a location outside of the selected text and released the predefined mouse button while depressing the Alt key, causing text manipulation options to appear in the first preferred embodiment of the present invention.

FIG. 10 shows an alternative implementation of the first preferred embodiment of the present invention. In particular, a pop-up menu 60 appears after the user drags the insertion point outside the selected text and releases the mouse button. The user then uses the mouse button to select one of the text manipulation options, such as "copy," "move," or "link." A similar pop-up menu is used in the second preferred embodiment of the present invention, which is described below.

Figure 11:
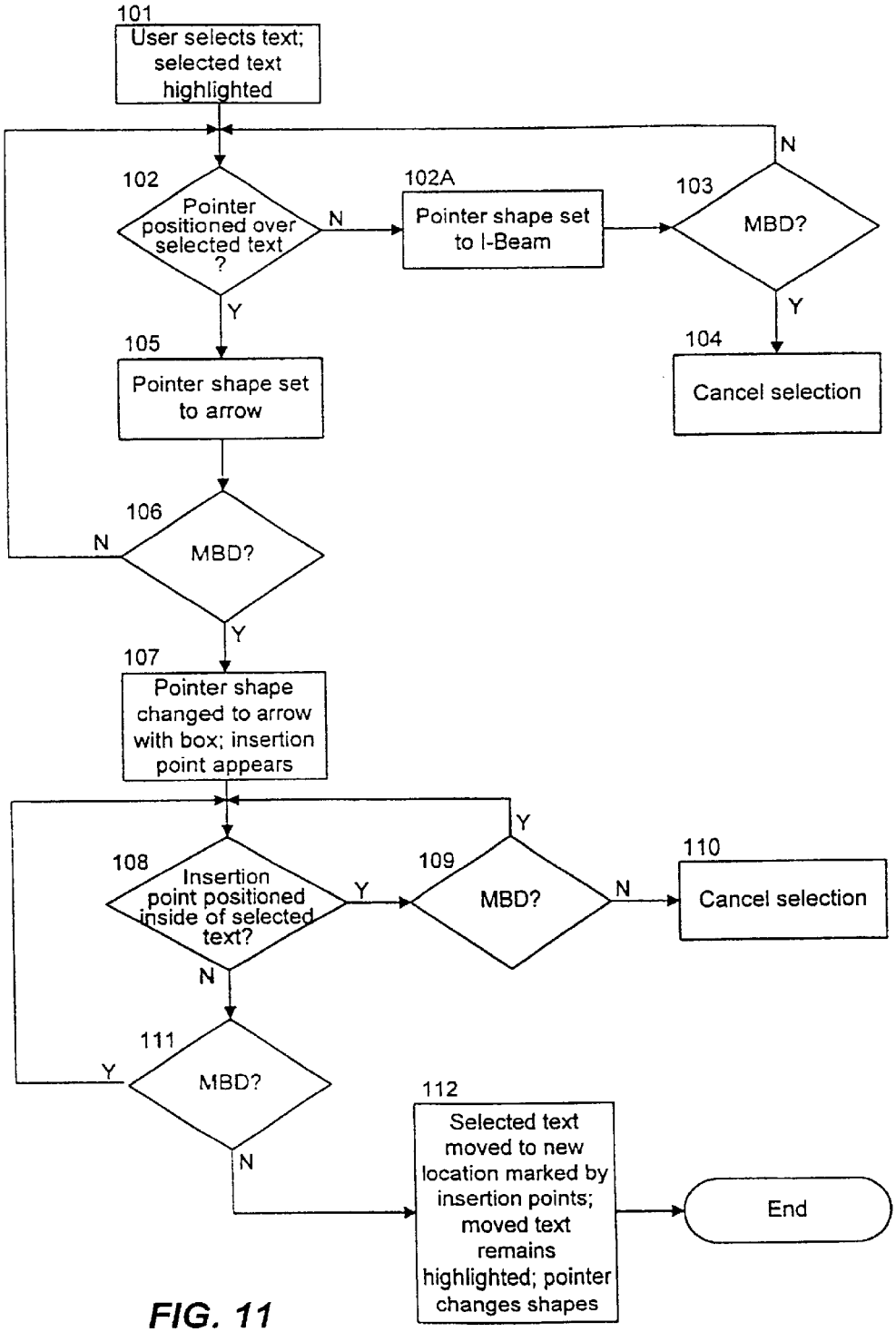
FIG. 11 is a detailed flow diagram of a text manipulation process which moves text from one location to another in a document in accordance with the first preferred embodiment of the present invention.

FIG. 11 is a detailed diagram of the steps performed in the first preferred embodiment of the present invention. The process of this first preferred embodiment begins with step 101, where the user must select a portion of text in the document using the mouse and mouse button. The selected text is highlighted. Next, the process continues with step 102, where the process queries whether the pointers positioned over the selected text. If the pointer is not positioned over the selected text, the process makes sure and step 102A that the pointers shape is set to an I-beam and then queries in step 103 whether the mouse button is down (MBD). If the mouse button is down and the pointer is now positioned over the selected text, the selection is canceled in step 104, the highlighting disappears and the user may make a new selection. If the process determines in step 103 that the mouse button is not down, the process loops back to step 102 to check the position of the pointer.

The process determines in step 102 that the pointer is positioned over the selected text and proceeds to step 105, where the pointer shape is changed. In the preferred embodiment described herein, the pointers change from its normal I-beamed shape to a slanted arrow. Once the pointer is positioned over the selected text, the process queries in step 106 whether the mouse button is down. If the mouse button is not down, the process loops at step 106. If the mouse button is down, the process continues on to step 107 where the pointer shape is then changed and the insertion point is displayed to mark the location in the document corresponding to the pointer position.

The process then queries in step 108 where the insertion point is positioned inside the selected text. The process checks the location of the insertion point rather than the pointer, because the pointer could be pointing to a location in the document other than the selected text while the insertion point is still within the selected text. Because the pointer may be positioned over any part of the screen, it follows the insertion point for the word processing documents does not always appear directly under the pointer. As shown in FIG. 3, even though the pointer 56 may be positioned passed the end of the text in the last line, the insertion point only appears immediately after the last typed character, including spaces.

When the insertion point is positioned inside of the selected text, the process queries in step 109 whether the mouse is still down. The process remains in the loop while the insertion point is positioned inside any part of the selected text and the mouse button 12 is down. If the mouse button 12 has been released while the insertion point is positioned inside of the selected text, the process continues on to step 110 where the selection is canceled and the process is terminated. The user may begin the process again by selecting text.

If the process determines in step 108 that the insertion point is positioned outside of the selected text, the process skips to step 111. In step 111 the process queries whether the mouse button is still down. While the mouse button is down, the process merely loops at step 111, waiting for the mouse button to be released. When the mouse button is released, the process continues on to step 112, where the selected text is moved to the location marked by the insertion point. The text remains highlighted in its new location and the pointer changes shape, the shape depending on the location of the pointer.

The second preferred embodiment of the present invention focuses on the non-default drag and drop feature described above relative to a word processing program. The second preferred embodiment of the present invention provides a more generalized mechanism for non-default drag and drop operation.

The second preferred embodiment of the present invention enables the user to perform a conventional drag and drop operation or, alternatively, a non-default drag (enhanced) and drop operation. The second preferred embodiment is applicable to any drag and drop operation and is not limited to drag and drop operations that involve text.

The second preferred embodiment of the present invention is especially well adapted for use in an object oriented programming environment. Hence, in the second preferred embodiment of the present invention described herein, the code for the operating system 50 provides an object-oriented programming environment. The target and source of the drag and drop operation are implemented as "objects." An object is a combination of data members (i.e., attributes held in data structures) and member functions that act upon the data members. Those skilled in the art will appreciate, however, that the second preferred embodiment of the present invention need not be implemented in an object-oriented programming environment.

Figure 12:
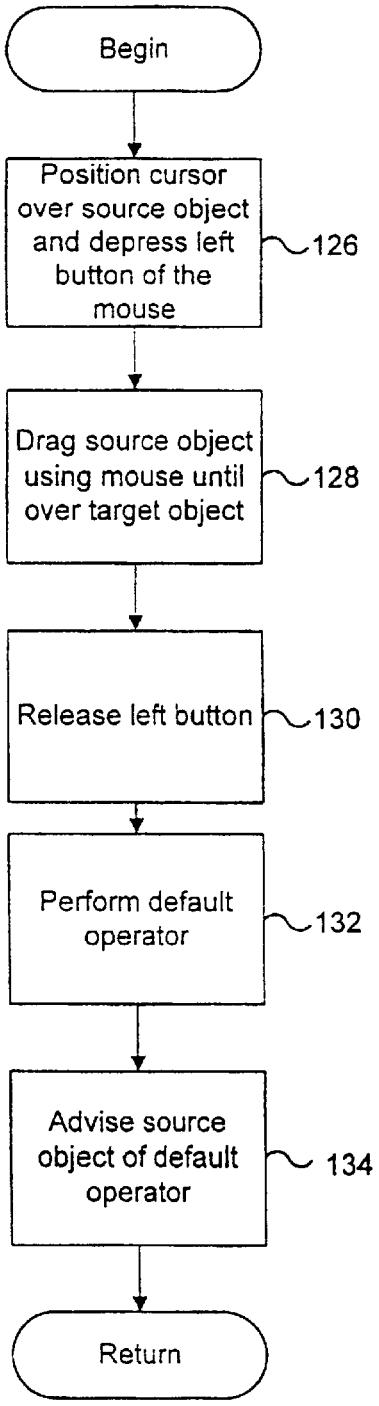
FIG. 12 is a flowchart showing the steps performed in a conventional drag and drop operation in accordance with the second preferred embodiment of the present invention.

FIG. 12 is a flowchart illustrating the steps that are performed in a conventional drag and drop operation using the primary button 12 of the mouse 10 (e.g., the left button in this case). Initially, a user moves the mouse 10 (FIG. 1) to move the cursor 16 (FIG. 2) on the video display 18 until the cursor is positioned over a source-visual element 20 that is associated with the source object. The user then clicks on the source-visual element 20 by depressing button 12 of the mouse 10 (step 126 in FIG. 12). While keeping the button 12 depressed, the user drags the source-visual element 20 (FIG. 2) across the video display 18 until the source-visual element 20 is positioned over a target visual element 22 that is associated with the target object (step 128 in FIG. 12). The user then releases the left button 12 of the mouse 10 to cause a drop in the source-visual element 20 onto the target-visual element 22 (step 130 in FIG. 12). A default operation is automatically performed (step 132), and the source-visual element 20 is advised of the default operation (step 134).

Figure 13:
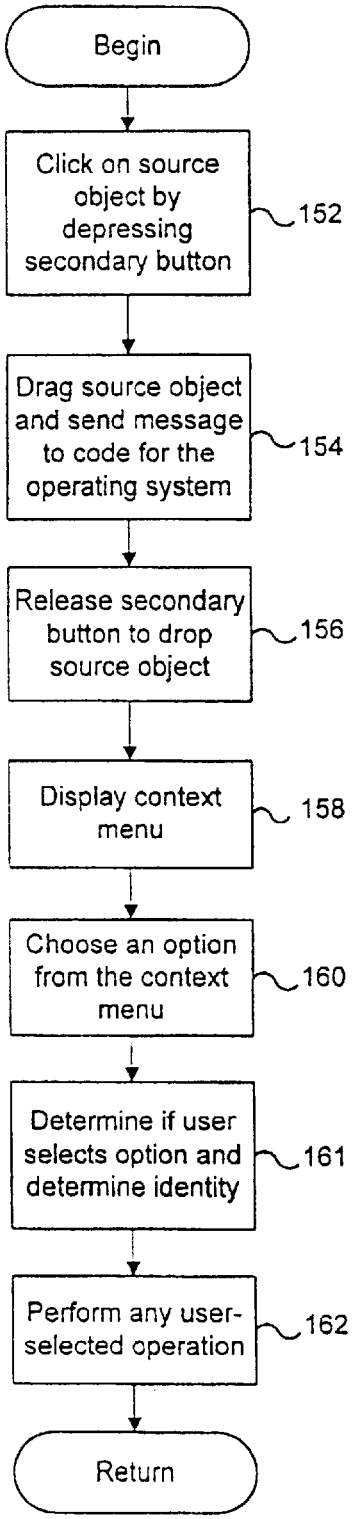
FIG. 13 is a flowchart showing the steps showing the steps performed by the second preferred embodiment of the present invention in an enhanced drag and drop operation.

The non-default or expanded drag and drop operation of the second preferred embodiment of the present invention is performed by executing the steps shown in the flowchart of FIG. 13. The expanded drag and drop operation is initiated by positioning the cursor 16 (FIG. 2) on the source-visual element 20 and clicking the secondary button 14 (FIG. 1) of the mouse 10 (step 152 in FIG. 13). The source-visual element 20 in the target-visual element may take many forms, including text, icons or graphic elements. The code for the source object 46 (FIG. 3) is informed that the cursor 16 has been positioned over the source-visual element and is also informed that the secondary button 14 (FIG. 1) of the mouse 10 has been depressed by the messages that are sent to it. Movement of the mouse 10 and depressing a mouse button are events that are translated into messages by the code for the operating system 50. These messages are placed in a message queue for the executing application program.

Each application program run on the operating system has a separate message queue. Each application program retrieves messages from the message queue using a selection of code known as the "message loop." Once the application program has retrieved a message from its message queue, the application program determines which window procedure should receive the message. A separate window procedure is provided for each window. The application program may provide several windows, and thus, the application program must determine which window is the proper destination for the message when the message is retrieved from the queue.

When the cursor 16 is positioned over the source-visual element 20, a message is generated that specifies the position of the cursor and the window which holds the source visual element 20. This message provides a relative position of the cursor 16 in (X,Y) coordinates relative to the upper left-hand corner of the window. The window procedure associated with the window that holds the source-visual element 20 receives this message and passes the message to the code for the source object 46 (FIG. 3). When the secondary button 14 (FIG. 1) of the mouse 10 is depressed, the code for the source object 46 receives a message informing of the depression of the secondary button.

Once step 152 of FIG. 13 is performed, the source visual element 20 (FIG. 2) is dragged by movement of the mouse 10 (FIG. 1) until the source-visual element is positioned over the target visual element 22. As the drag begins, the code for the source object 46 sends a message to the code for the operating system 50. This message holds an identifier for the source object associated with the source-visual element, information about the source-visual element 20 and an indication of the operations that may be performed on the source object (step 154 in FIG. 13). The code the operating system 50 is responsible for tracking the mouse movements until the source-visual element 20 is dropped.

Figure 14:
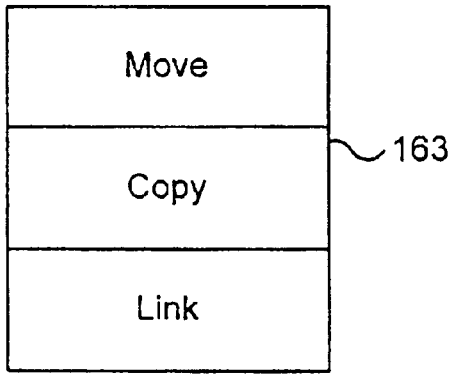
FIG. 14 shows an example context menu for an expanded drag and drop operation in the second preferred embodiment of the present invention.

When the source-visual element 20 is positioned over the target-visual element 22, the secondary button 14 of the mouse 10 is released to drop the source visual element (step 156 in FIG. 13). The code for the operating system 50 (FIG. 3) for the list of valid operations from the source object for code to the target object 48. A context menu 163, such as shown in FIG. 14, is then displayed to show the possible operations that a user may perform (step 158 in FIG. 13). The operations listed on the context menu may include operations such as "move," "copy," and "link." Among the operations shown in the context menu 163 is the default operation, which is indicated in boldface (note that "move" is boldfaced in FIG. 14). The operations listed in the context menu 163 depend upon the nature of the target object and the source object. The determination of what operations are listed on the context menu 163 will be described in more detail below. The user then may choose an operation for the context menu 163 (step 160 in FIG. 13). The system determines that the selection is chosen and determines the identity of any such user-selected operation (step 161). The selection option is then performed (step 162). The user may also cancel the effect of the drag and drop operation so that no operation is performed. For example, a canceled option may be provided on the context menu 162 (FIG. 14) or the user may cancel the operation by hitting the escape button or clicking the mouse outside the menu.

In order to understand what occurs once the source-visual element 20 (FIG. 2) is positioned over the target-visual element 22 in the second preferred embodiment of the present invention, it is helpful to review the steps performed by the code for the target object 48 (FIG. 3).

Figure 15:
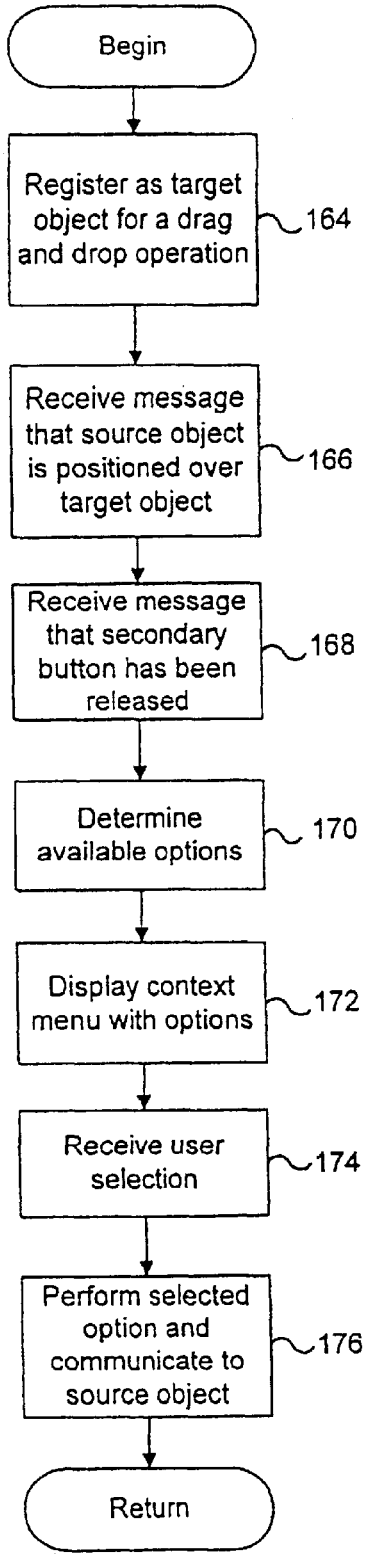
FIG. 15 is a flowchart illustrating the steps performed by the target object in an enhanced drag and drop operation in the second preferred embodiment of the present invention.

FIG. 15 is a flowchart showing the steps performed by the target object for a typical drag and drop sequence in the second preferred embodiment of the present invention. Before a target object may be a target for a drag and drop operation, it must first register as a target (step 154). If an object is not registered as a target object, a source object will not be allowed to drop on the target object. Later, once the drag and drop operation is in progress, the target object receives a message that the source-visual element 20 is positioned over the target-visual element 22 (step 166). Subsequently, the target object receives the message that the secondary button 14 (FIG. 1) of the mouse 10 has been released to initiate a drop (step 168 in FIG. 15). This message of the mouse message that is not placed into the message queue, as described above, but rather is sent directly to the target object to ensure that the target object is properly informed of the drop. The target object then determines what operations are available to the user (step 170). The determination of the available operation is performed by negotiation between the source object and the target object. The source object may have restrictions on the operations that can be performed on it. Likewise, the target object may have similar restrictions. Both the source object and the target object provide sets of possible operations that may be performed. The target object then determines the intersection of these two sets as the available set of operations (see step 170).

Once the available operations have been determined, a context menu 163 (FIG. 14) is displayed on the video display 44 with a list of the available operations (step 172). The user makes a selection from the context menu 163 and the selection is relayed to the target object (step 174). The code for the target object 148 then performs a selected option that communicates with which operation was selected by the user to the source object (step 176).

While the present invention has been described with reference to a preferred embodiment thereof, those skilled in the art will, nevertheless, appreciate that various changes in form and detail may be made without departing from the present invention, as defined in the appended claims.

I claim:

1. In a computer system employing a graphical user interface and including a display and a user interface selection device, a method for moving text displayed in window, comprising the steps of:

displaying text in a window;

displaying a cursor in the window, the cursor being responsive to signals from the user interface selection device;

receiving a first selection signal indicating that a portion of the displayed text has been selected;

receiving a first position signal indicating that the cursor is positioned at a first position coinciding with the selected text;

[in response to the first position signal, altering the appearance of the cursor to indicate that the selected text may be moved;]

receiving a second selection signal, the second selection signal being received while the cursor is in the first position;

in response to the second selection signal, altering the appearance of the cursor to indicate the selected text is in the process of being moved;

receiving a second position signal indicating that the cursor is positioned at a second position, the second positioned being different from the first position, the cursor being moved while the second selection signal is maintained;

receiving a third selection signal; and in response to the third selection signal, moving the selected text to the second position.

2. The method of claim 1, wherein the first selection signal comprises dragging the cursor across a portion of the displayed text.

3. The method of claim 1, wherein the second selection signal comprises a mouse button down signal and the third selection signal comprises a mouse button up signal.

4. A computer-readable medium having computer-executable instructions for performing steps comprising:

displaying text in a window;

displaying a cursor in the window, the cursor being responsive to signals from the user interface selection device;

receiving a first selection signal indicating that a portion of the displayed text has been selected;

receiving a first position signal indicating that the cursor is positioned at a first position coinciding with the selected text;

[in response to the first position signal, altering the appearance of the cursor to indicate that the selected text may be moved;]

receiving a second selection signal, the second selection signal being received while the cursor is in the first position;

in response to the second selection signal, altering the appearance of the cursor to indicate the selected text is in the process of being moved;

receiving a second position signal indicating that the cursor is positioned at a second position, the second positioned being different from the first position, the cursor being moved while the second selection signal is maintained;

receiving a third selection signal; and in response to the third selection signal, moving the selected text to the second position.

5. The computer-readable medium of claim 4, wherein the first selection signal comprises dragging the cursor across a portion of the displayed text.

6. The computer-readable medium of claim 4, wherein the second selection signal comprises a mouse button down signal and the third selection signal comprises a mouse button up signal.

*7. The method of claim 1, further comprising the step of:*

*in response to the first position signal, altering the appearance of the cursor to indicate that the selected text may be moved.*

*8. The computer-readable medium of claim 4, wherein the computer-executable instructions further perform the step of:*

*in response to the first position signal, altering the appearance of the cursor to indicate that the selected text may be moved.*

* * * * *